United States Patent
Zeng et al.

(10) Patent No.: US 9,135,930 B1
(45) Date of Patent: Sep. 15, 2015

(54) METHOD FOR FABRICATING A MAGNETIC WRITE POLE USING VACUUM DEPOSITION

(71) Applicant: Western Digital (Fremont), LLC, Fremont, CA (US)

(72) Inventors: Li Zeng, Fremont, CA (US); Dehua Han, Fremont, CA (US); Ming Sun, Pleasanton, CA (US); Jose A. Medina, Pleasanton, CA (US); Jia Li, San Jose, CA (US); Liang Hong, Pleasanton, CA (US); Zhigang Bai, Fremont, CA (US); Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/300,482

(22) Filed: Jun. 10, 2014

Related U.S. Application Data (60) Provisional application No. 61/948,945, filed on Mar. 6, 2014.

(51) Int. Cl.
    *G11B 5/127* (2006.01)
(52) U.S. Cl.
    CPC ..................... *G11B 5/127* (2013.01)
(58) Field of Classification Search
    CPC .. G11B 5/3116; G11B 5/3163; G11B 5/6005; G11B 5/3967; G11B 5/865; G11B 2005/3996
    USPC .................................................. 360/125.02
    See application file for complete search history.

(56) References Cited

U.S. PATENT DOCUMENTS

| | | | |
|---|---|---|---|
| 5,157,570 | A | 10/1992 | Shukovsky et al. |
| 5,559,654 | A | 9/1996 | Das |
| 5,750,275 | A | 5/1998 | Katz et al. |
| 5,792,547 | A | 8/1998 | Liu et al. |
| 5,996,213 | A | 12/1999 | Shen et al. |
| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |

(Continued)

FOREIGN PATENT DOCUMENTS

WO  9928904 A1  6/1999

OTHER PUBLICATIONS

D Kleinberg; "Applications of Reactive Ion Beam Etching to Thin Film Magnetic Head Track-Width Trimming," Veeco Instruments, Inc.; printed from www.veeco.com on Oct. 18, 2011.

*Primary Examiner* — Mark Blouin (57) ABSTRACT

A method and system provide a magnetic transducer having an air-bearing surface (ABS) and an intermediate layer. A trench having a shape and location corresponding to a main pole is formed in the intermediate layer. The main pole is provided. At least a portion of the main pole is in the trench. Providing the main pole further includes vacuum depositing a first main pole material layer. The first main pole material layer is thin enough to preclude filling of the trench. The first main pole material layer is then ion beam etched. A second main pole layer is vacuum deposited on the first main pole layer. The second main pole material layer is also thin enough to preclude filling of the trench. An additional main pole layer is also deposited.

17 Claims, 8 Drawing Sheets

(56) References Cited

U.S. PATENT DOCUMENTS

| | | | |
|---|---|---|---|
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,597 B1 | 3/2001 | Tateyama et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,238,582 B1 | 5/2001 | Williams et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,339,523 B1 | 1/2002 | Santini |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,466,416 B1 | 10/2002 | Honjo et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,564,445 B1 * | 5/2003 | Hashimoto et al. ........ 29/603.14 |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |

(56) References Cited

U.S. PATENT DOCUMENTS

| | | |
|---|---|---|
| 6,618,223 B1 | 9/2003 | Chen et al. |
| 6,629,357 B1 | 10/2003 | Akoh |
| 6,633,464 B2 | 10/2003 | Lai et al. |
| 6,634,087 B2 * | 10/2003 | Horng et al. ............... 29/603.08 |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,131 B2 | 4/2004 | Litvinov et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,723,449 B2 | 4/2004 | Kudo et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,272 B2 | 9/2004 | Kudo et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,930,863 B2 | 8/2005 | Biskeborn |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,024,756 B2 | 4/2006 | Le et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,064,924 B2 | 6/2006 | Ju et al. |
| 7,085,100 B2 | 8/2006 | Harris, III et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,314 B2 | 10/2007 | Gill et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |

(56) References Cited

U.S. PATENT DOCUMENTS

| | | |
|---|---|---|
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,574 B2 | 6/2008 | Li et al. |
| 7,382,577 B2 | 6/2008 | Han et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,573,683 B1 | 8/2009 | Benakli et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,110,085 B2 | 2/2012 | Hsiao et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,320 B2 | 3/2012 | Hsiao et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |

(56) References Cited

U.S. PATENT DOCUMENTS

| | | |
|---|---|---|
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 * | 9/2013 | Wang et al. ............ 29/603.14 |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2002/0111010 A1 | 8/2002 | Walker et al. |
| 2003/0197976 A1 | 10/2003 | Van der Heijden et al. |
| 2004/0037002 A1 | 2/2004 | Kudo et al. |
| 2004/0061973 A1 | 4/2004 | Crue et al. |
| 2004/0066574 A1 | 4/2004 | Crue et al. |
| 2005/0013044 A1 | 1/2005 | Hirata et al. |
| 2006/0002021 A1 | 1/2006 | Li et al. |
| 2006/0044677 A1 | 3/2006 | Li et al. |
| 2006/0119981 A1 | 6/2006 | Li et al. |
| 2008/0218910 A1 | 9/2008 | Kojima et al. |
| 2009/0052092 A1 | 2/2009 | Zhou et al. |
| 2010/0163422 A1 | 7/2010 | Hsiao et al. |

(56) References Cited

U.S. PATENT DOCUMENTS

| | | |
|---|---|---|
| 2010/0290157 A1 | 11/2010 | Zhang et al. |
| 2011/0086240 A1 | 4/2011 | Xiang et al. |
| 2011/0102942 A1 | 5/2011 | Bai et al. |
| 2012/0111826 A1 | 5/2012 | Chen et al. |
| 2012/0164486 A1* | 6/2012 | Bonhote et al. ............ 428/812 |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0304454 A1 | 12/2012 | Jiang et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

ABS View
FIG. 5A

ABS View
FIG. 5B

METHOD FOR FABRICATING A MAGNETIC WRITE POLE USING VACUUM DEPOSITION

CROSS-REFERENCE TO RELATED APPLICATIONS

This application claims priority to provisional U.S. Patent Application Ser. No. 61/948,945, filed on Mar. 6, 2014, which is hereby incorporated by reference in its entirety.

BACKGROUND

Figure 1:
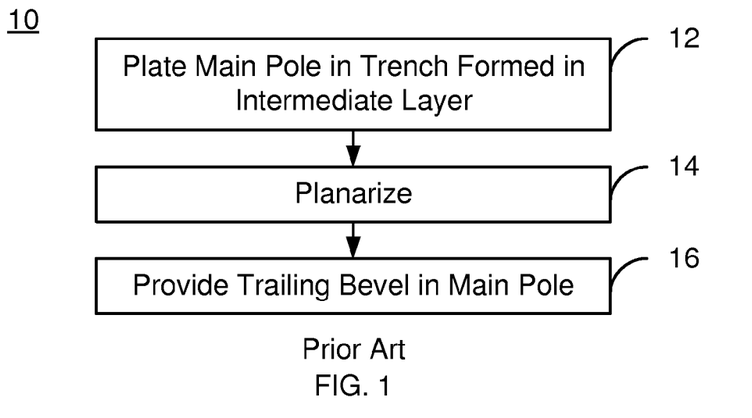
FIG. 1 is a flow chart depicting a conventional method for fabricating a pole in a magnetic recording transducer.

FIG. 1 depicts a conventional method 10 for fabricating a conventional magnetic recording head. The method starts after a nonmagnetic intermediate layer, such as aluminum oxide, is provided. A trench has also been formed in the intermediate layer, for example using reactive ion etch(es) (RIE(s)). A seed layer for electroplating has also been provided. For example Ru or another conductive material may be deposited. The high saturation magnetization pole materials are plated, via step 12. For example, CoFe may be plated in step 12. Because of the profile of the trench, a leading edge bevel may be formed in the electroplated materials. For example, the trench may be shallower at the air-bearing surface (ABS), which allows for formation of the leading bevel. The magnetic materials are planarized, via step 14. Thus, the main pole is substantially formed. However, the top of the main pole is substantially flat. Thus, a trailing bevel may be provided in the main pole, via step 16. In some cases, the formation of the trailing bevel is interleaved with other steps, such as formation of the side and trailing shields. Fabrication of the transducer may then be completed.

Figure 2:
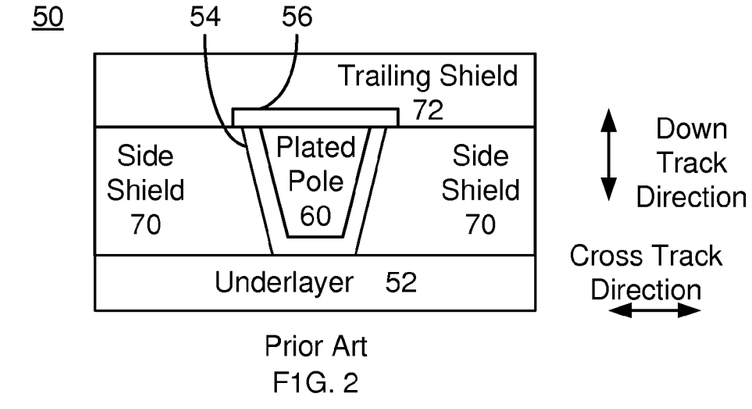
FIG. 2 depicts ABS view of a conventional magnetic recording head.

FIG. 2 depicts an ABS view of a conventional magnetic recording head 50 formed using the method 10. The conventional magnetic recording transducer 50 may be a part of a merged head including the write transducer 50 and a read transducer (not shown). Alternatively, the magnetic recording head may be a write head including only the write transducer 50. The conventional transducer 50 includes an underlayer 52, side gap 54, main pole 60, side shields 70, top (write) gap 56, and optional top (trailing) shield 72.

Although the conventional magnetic recording head 50 formed using the method 10 functions, there are drawbacks. In particular, the conventional magnetic recording head 50 may not perform sufficiently at higher recording densities. For example, the write field of the conventional main pole 20 may not have a sufficiently high magnitude write field. For example, the reverse overwrite and magnetic field gradient may be less than desired. Accordingly, what is needed is a system and method for improving the performance of a magnetic recording head.

BRIEF DESCRIPTION OF SEVERAL VIEWS OF THE DRAWINGS

FIGS. 8 through 17A and 17B depict various views of an exemplary embodiment of a magnetic recording transducer fabricated using the method.

DETAILED DESCRIPTION OF THE PREFERRED EMBODIMENTS

Figure 3:
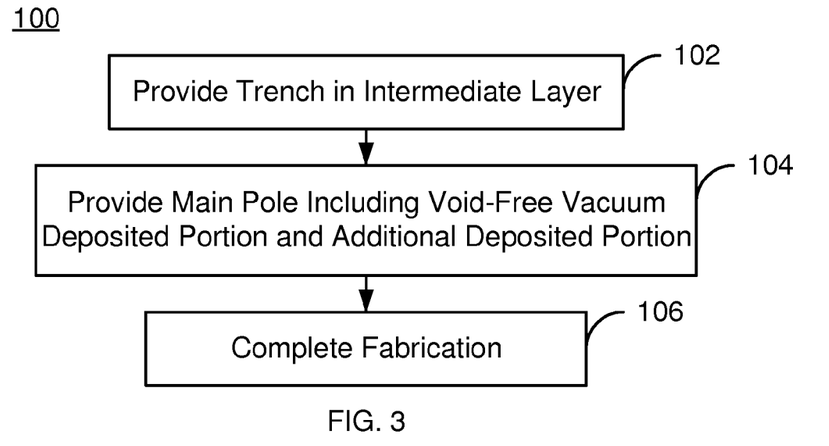
FIG. 3 depicts an exemplary embodiment of a method for providing a magnetic recording transducer.

FIG. 3 depicts an exemplary embodiment of a method 100 for providing a magnetic recording transducer. For simplicity, some steps may be omitted, interleaved, combined, have multiple substeps and/or performed in another order unless otherwise specified. The method 100 is described in the context of providing a magnetic recording disk drive and transducer. However, the method 100 may be used to fabricate multiple magnetic recording transducers at substantially the same time. The method 100 is also described in the context of particular layers. A particular layer may include multiple materials and/or multiple sub-layers. The method 100 also may start after formation of other portions of the magnetic recording head. For example, the method 100 may start after a read transducer, return pole/shield and/or other structure have been fabricated. The method 100 may start after the intermediate layer in which the main pole is to be formed has already been provided.

A trench is formed in the intermediate layer, via step 102. In some embodiments, step 102 includes performing one or more reactive ion etches (RIEs). The trench has a shape and location that corresponds to a main pole.

A main pole is provided in the trench, via step 104. The main pole is void-free and includes a vacuum deposited portion and an additional portion that may not be vacuum deposited. For example, in some embodiments, step 104 may include vacuum depositing a first main pole material layer that thin enough to preclude filling of the trench. The vacuum deposition may include ion beam deposition (IBD). The first main pole layer may then undergo an ion beam etch (IBE). The IBE removes some, but not all of the first main pole layer. A second main pole layer is then vacuum deposited. In some embodiments, the second main pole layer is sufficiently thin to preclude filling of the trench. The IBE and/or deposition steps may be repeated until a desired portion of the trench has been filled. For example, the second main pole layer may be partially removed via an IBE and a third main pole layer vacuum deposited using IBD. In some embodiments, the third main pole layer is etched. In other embodiments, the third main pole layer may not be etched.

An addition additional main pole layer may then be deposited in another manner. For example, the additional main pole layer may be electroplated. Note that although the deposition methods differ, the same material may be deposited. For example, CoFe may be deposited via IBDs, then etched using IBE(s). In some embodiments, the CoFe may include at least sixty-three atomic percent and no more than seventy-one atomic percent of Fe. However, other concentrations of Fe and/or other materials may be used in other embodiments. An additional layer of CoFe might be deposited, for example using electroplating. This electroplated CoFe may have the same concentration range of Fe as the vacuum deposited layers. However, in other embodiments, other materials may be used for the vacuum deposited and/or electroplated layers.

Fabrication of the transducer may then be completed. Via step 106. For example, coils, shields, contacts, insulating structures and other components may be provided. In addition, the slider may be lapped and otherwise completed.

Using the method 100, a magnetic transducer having improved performance may be fabricated. In particular, some portion of the main pole may be formed using vacuum deposition. This formation process allows for a higher saturation magnetization main pole. This is because vacuum deposited materials may have a higher saturation magnetization than the same materials that are provided using another mechanism, such as electroplating. Thus overwrite gain, writeability and field gradient may be improved. Further, step 104 allows void free vacuum deposition. Vacuum deposition of pole materials may otherwise result in formation of voids within the main pole due to shadowing. Because such voids may be avoided or reduced using the method 100, the performance and reliability of the man pole may be improved. In addition, the domain structure of the main pole may be closer to that desired. Vacuum deposited pole materials, particularly at thicknesses used for the main pole, may exhibit stripe domains. Such domains degrade the performance of the magnetic pole. Use of the method 100 may reduce or eliminate the formation of a stripe domain structure. Thus, performance of the main pole may be improved. Finally, the use of materials provided in another manner, such as electroplating, to complete the pole may facilitate fabrication without adversely affecting performance of the main pole.

Figure 4:
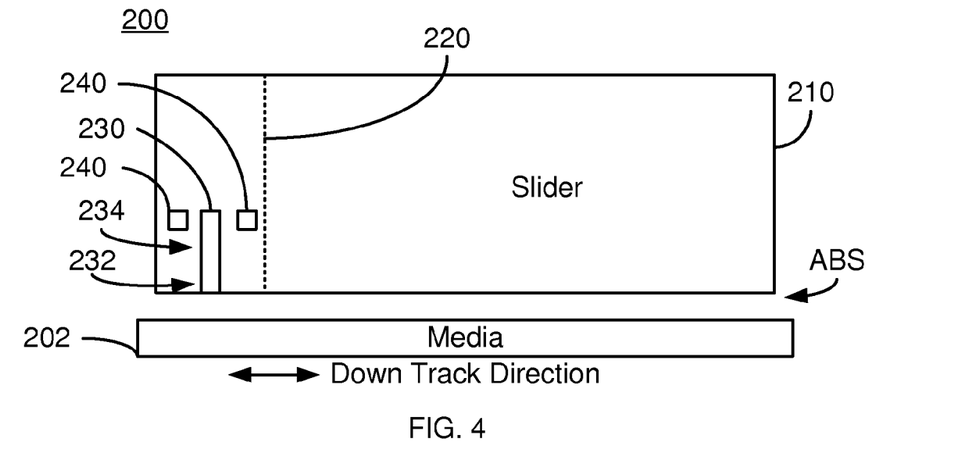
FIG. 4 depicts an exemplary embodiment of a magnetic recording disk drive.
Figure 5A:
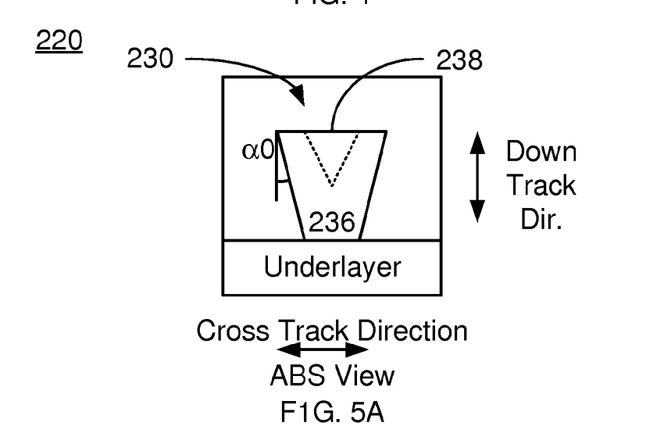
FIGS. 5A and 5B depict ABS and side (apex) views of an exemplary embodiment of a magnetic recording transducer.
Figure 5B:
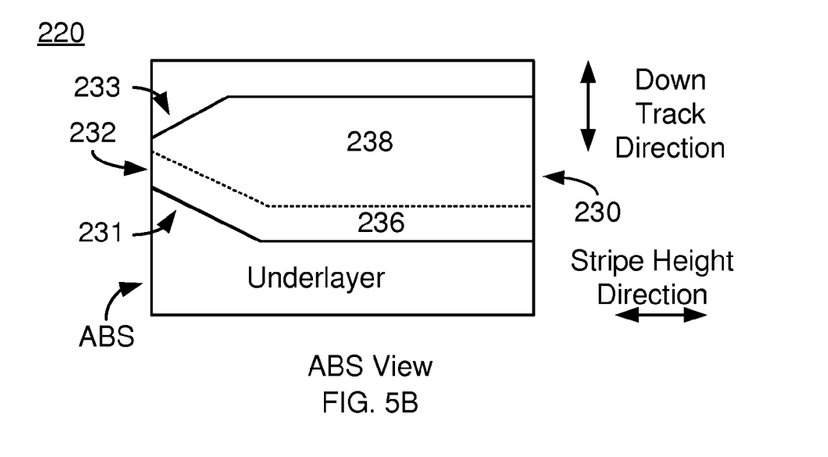

FIG. 4 depicts a side view of an exemplary embodiment of a portion of a disk drive 200 including a write transducer 220. FIGS. 5A and 5B depict ABS and apex (side) views of the transducer 220. For clarity, FIGS. 4, 4A and 5B are not to scale. For simplicity not all portions of the disk drive 200 and transducer 220 are shown. In addition, although the disk drive 200 and transducer 220 are depicted in the context of particular components other and/or different components may be used. For example, circuitry used to drive and control various portions of the disk drive 200 is not shown. For simplicity, only single components 202, 210, 220, 230 and 240 are shown. However, multiples of each component 202, 210, 220, 230 and 240 and/or their sub-components, might be used. The disk drive 200 may be a perpendicular magnetic recording (PMR) disk drive. However, in other embodiments, the disk drive 100 may be configured for other types of magnetic recording included but not limited to heat assisted magnetic recording (HAMR).

The disk drive 200 includes media 202, a slider 210 and a write transducer 220. Additional and/or different components may be included in the disk drive 200. Although not shown, the slider 210 and thus the transducer 220 are generally attached to a suspension (not shown). The transducer 220 is fabricated on the slider 210 and includes an air-bearing surface (ABS) proximate to the media 202 during use. In general, the disk drive 200 includes the write transducer 220 and a read transducer (not shown). However, for clarity, only the write transducer 220 is shown. The transducer 220 includes a main pole 230 residing on an underlayer and coils 240. The underlayer may have multiple structures therein including but not limited to a leading edge shield and gap. Although not separately labeled, the transducer 220 may include side shields, a top/write gap, a side gap and/or a trailing shield. In other embodiments, different and/or additional components may be used in the write transducer 220.

The coil(s) 240 are used to energize the main pole 230. Two turns 240 are depicted in FIG. 5A. Another number of turns may, however, be used. Note that only a portion of the coil(s) 240 is shown in FIG. 4. If, for example, the coil(s) 240 form a helical coil, then additional portion(s) of the coil(s) 240 may be located on the opposite side of the main pole 230 as is shown. If the coil(s) 240 is a spiral, or pancake, coil, then additional portions of the coil(s) 240 may be located further from the ABS. Further, additional coils may also be used.

The main pole 230 includes a pole tip region 232 close to the ABS and a yoke region 234 recessed from the ABS. The pole tip region 232 is shown as having top and bottom bevels 231 and 233, respectively, near the ABS. The leading edge bevel 231 may be formed due to the profile of the trench. For example, the trench may be shallower at the ABS. This portion is shown in FIG. 5B. In addition, the pole tip region 232 includes sidewalls in the cross track direction. The sidewalls are configured such that the pole 230 has a bottom and a top wider than the bottom. Thus, the main pole 230 is shown as having a sidewall angle α0 at the ABS. However, other geometries are possible.

The main pole 230 is also shown as including a vacuum deposited portion 236 and an additional portion 238. In some embodiments, the portions 236 and 238 are formed of the same materials, such as CoFe. However, the saturation magnetization and method for depositing the portions 236 and 248 differ. Consequently, these regions are separated by a dashed line in FIGS. 5A and 5B. The vacuum deposited portion is shown as occupying a greater fraction of the pole 230 in the pole tip region 232 than in the yoke/regions that are recessed from the ABS. In some embodiments, the vacuum deposited portion forms all of the pole at and near the ABS. The vacuum deposited portion 236 may be a single layer or may include multiple layers. In some embodiments, the vacuum deposited portion 236 includes one or more layers of IBD CoFe, at least some of which have undergone an IBE. The additional portion 238 occupies a greater portion of the yoke. The additional portion 238 may be deposited in another manner, for example using electroplating.

The magnetic disk drive 200 and write transducer 220 may enjoy the benefits discussed above. For example, the main pole 230 may have a higher saturation magnetization, having the desired domain structure, sufficient overwrite and magnetic field gradient. Thus, performance of the transducer 220 may be improved. In addition, because the additional portion 238 may be deposit using methods such as electroplating, yield and throughput may not be sacrificed.

Figure 6:
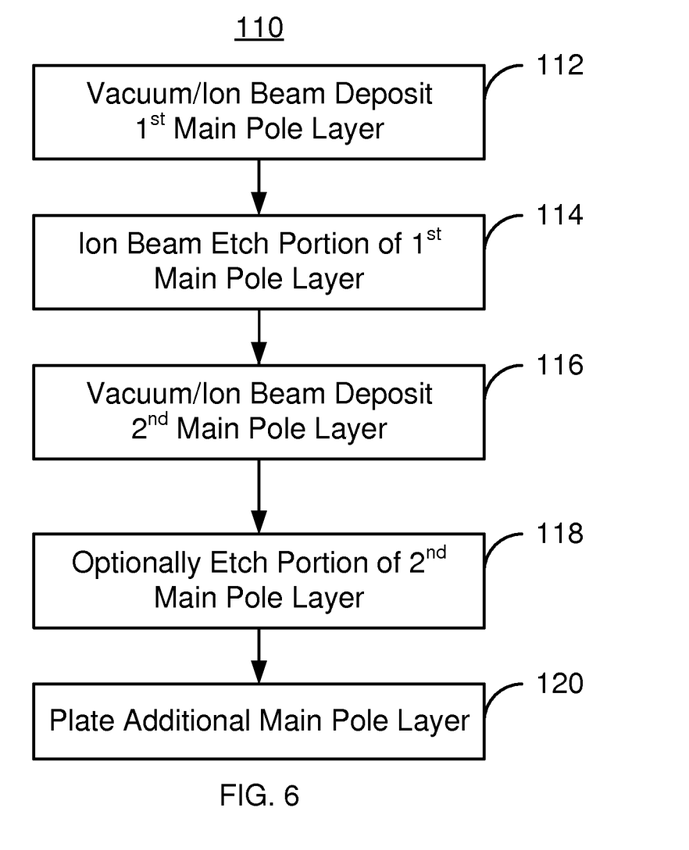
FIG. 6 depicts a flow chart of an exemplary embodiment of a method for providing a magnetic recording transducer.

FIG. 6 depicts an exemplary embodiment of a method 110 for providing a magnetic recording transducer having a main pole with a vacuum deposited portion. For simplicity, some steps may be omitted, interleaved, performed in another order and/or combined. The method 110 is described in the context of providing a magnetic recording disk drive 200 and transducer 220 depicted in FIGS. 4, 5A and 5B. However, the method 110 may be used to fabricate multiple magnetic recording heads at substantially the same time. The method 110 may also be used to fabricate other magnetic recording transducers. The method 110 is also described in the context of particular layers. A particular layer may include multiple materials and/or multiple sub-layers. The method 110 also may start after formation of other portions of the magnetic recording head. For example, the method 110 may start after a read transducer, return pole/shield, intermediate layer, trench in the intermediate layer and/or other structures have been fabricated.

Referring to FIGS. 4, 5A-5B and 6, a first main pole layer is vacuum deposited, via step 112. The first main pole layer may be a magnetic layer. For example, the first main pole layer may include CoFe having at least sixty-three atomic percent Fe and not more than seventy-one atomic percent Fe. On other embodiments, other magnetic materials may be used. The first main pole layer does not fill the trench. Stated differently, the first layer from opposite sides of the trench may not come together to close the trench. Formation of voids may thus be prevented. In some embodiments, the first main pole layer has a thickness of at least ten nanometers and not more than one hundred nanometers. In some such embodiments, the first main pole layer is nominally forty-five nanometers thick (e.g. at least forty and not more than fifty nanometers). In some embodiments, step 112 includes performing an IBD at a deposition angle. For example, the deposition angle may be at least zero degrees and not more than sixty degrees from normal (perpendicular) to the surface of the intermediate layer. In some embodiments, the deposition angle for IBD is nominally fifty-one degrees. In some embodiments, the IBD may be performed in a rotation mode (beam rotating about the normal to the surface of the intermediate layer at the deposition angle).

A portion of the first main pole layer is removed, via step 114. For example, an IBE may be used. The IBE may remove at least one nanometer and not more than ten nanometers of the first main pole layer. For example, step 114 may remove nominally five nanometers (e.g. at least three nanometers and not more than seven nanometers) from the first main pole layer. The IBE may be carried out at an etch angle of at least zero degrees and not more than sixty degrees from perpendicular to the surface of the intermediate layer. For example, the etch angle for the IBE of step 114 may be nominally fifty-five degrees. In some embodiments, the IBE may be performed in a sweep mode (beam sweeping across the device being built at the etch angle from the normal to the surface of the intermediate layer).

A second main pole layer is vacuum deposited, via step 116. The second main pole layer may be a magnetic layer. For example, the first second pole layer may include CoFe having at least sixty-three atomic percent Fe and not more than seventy-one atomic percent Fe. On other embodiments, other magnetic materials may be used. In some embodiments, the first and second main pole layers include the same magnetic materials. However, the first and second main pole layers might include different materials in other embodiments. The second main pole layer only partially fills the trench. The second main pole layer on opposite sides of the trench may, therefore, not meet to close off the trench. Formation of voids may thus be prevented. In some embodiments, the second main pole layer has a thickness of at least ten nanometers and not more than one hundred nanometers. In some such embodiments, the second main pole layer is nominally forty-five nanometers thick (e.g. at least forty and not more than fifty nanometers). In some embodiments, step 116 includes performing an IBD at a deposition angle. For example, the deposition angle may be at least zero degrees and not more than sixty degrees from normal to the surface of the intermediate layer. In some embodiments, the deposition angle for IBD is nominally thirty-eight degrees. This angle may be desired to be smaller than the angle used in step 112 because the trench has been further filled by the first and second main pole layers. In some embodiments, the IBD of step 116 may be performed in a rotation mode.

A portion of the second main pole layer may optionally be removed, via step 118. For example, an IBE may be used. The IBE may remove at least one nanometer and not more than ten nanometers of the second main pole layer. For example, step 118 may remove nominally five nanometers (e.g. at least three nanometers and not more than seven nanometers) from the second main pole layer. The IBE may be carried out at an etch angle of at least zero degrees and not more than sixty degrees from perpendicular to the surface of the intermediate layer. For example, the etch angle for the IBE of step 118 may be nominally forty degrees. In some embodiments, the IBE of step 118 may be performed in a sweep mode. Note, however, that step 118 may be omitted in some embodiments. Steps 116 and 118 may also optionally be repeated additional time(s) to provide the desired level of filling of the trench. For example, a third main pole layer may be vacuum deposited. This deposition might performed using IBD at a deposition angle analogous to those described above. Part of the third main pole layer might also be optionally be removed. This removal may be accomplished using an IBE at an etch angle analogous to those discussed above. Thus, using steps 112, 114, 116 and 118 may be used to form the vacuum deposited portion 236 of the main pole 230.

An additional main pole layer is provided without using vacuum deposition, via step 120. For example, step 120 may include plating the additional main pole layer. The trench is filled in step 120. In some embodiments, the additional main pole layer not only fills the trench, but covers a portion of the magnetic transducer outside of the trench. The additional main pole layer may include CoFe having at least sixty-three atomic percent Fe and not more than seventy-one atomic percent Fe. On other embodiments, other magnetic materials may be used. Fabrication of the main pole and transducer may then be completed. For example, a planarization such as a chemical mechanical planarization (CMP) and an additional etch may remove the pole material(s) outside of the trench. A trailing bevel 233 may also be formed in the main pole 230. For example, a portion of the main pole 230 recessed from the ABS may be masked and the main pole materials milled to form the trailing bevel 233. Other structures, such as side and trailing shield(s) (or a wraparound shield) and gaps may be provided.

Using the method 110, a main pole 230 having improved performance may be fabricated. In particular, a portion 236 of the main pole may be formed using vacuum deposition and etching of multiple layers. This formation process allows for a higher saturation magnetization, void-free main pole. Thus overwrite gain, field gradient and reliability may be improved. Further, the domain structure of the main pole 230 may be closer to that desired. Use of the method 110 may reduce or eliminate the formation of a stripe domain structure. Thus, performance of the main pole may be improved. Finally, the use of electroplated materials 238 for the main pole 230 may facilitate fabrication without adversely affecting performance of the main pole. Thus, performance of the main pole 230 fabricated using the method 110, and the transducer 220 and disk drive 200 in which it resides, may be improved.

Figure 7:
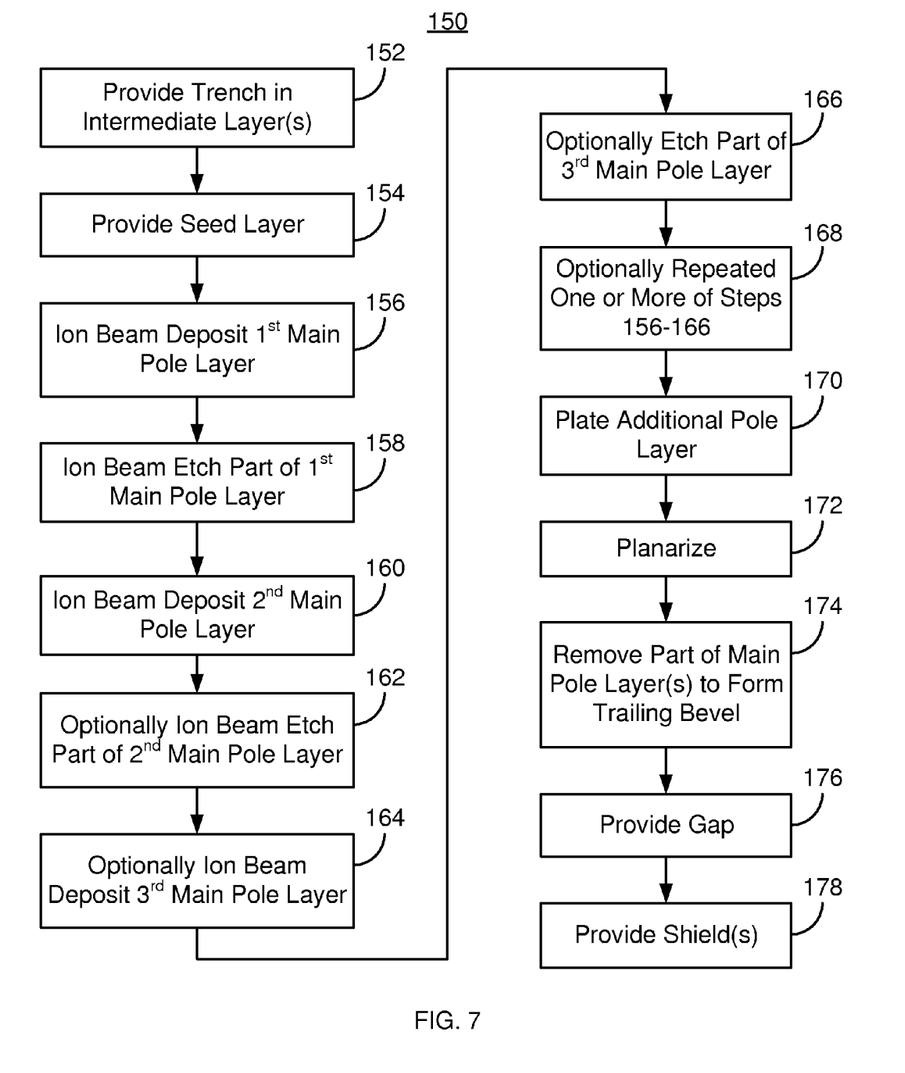
FIG. 7 depicts a flow chart of another exemplary embodiment of a method for providing a main pole of a magnetic recording transducer.
Figure 8:
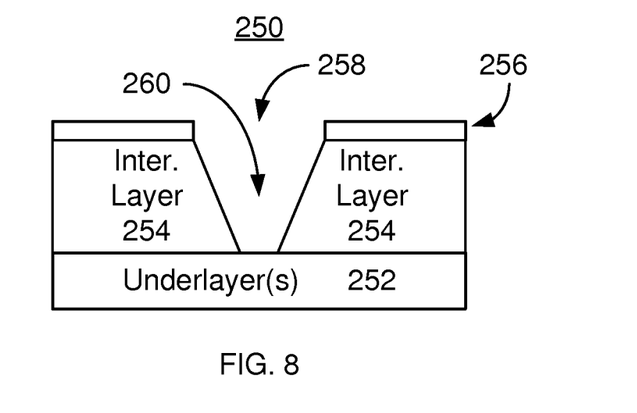
Figure 17A:
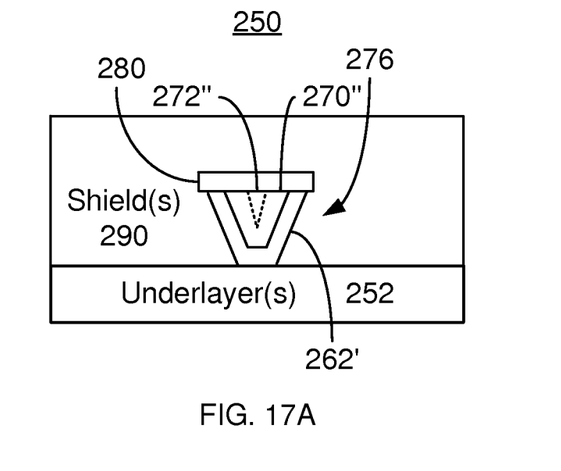
Figure 17B:
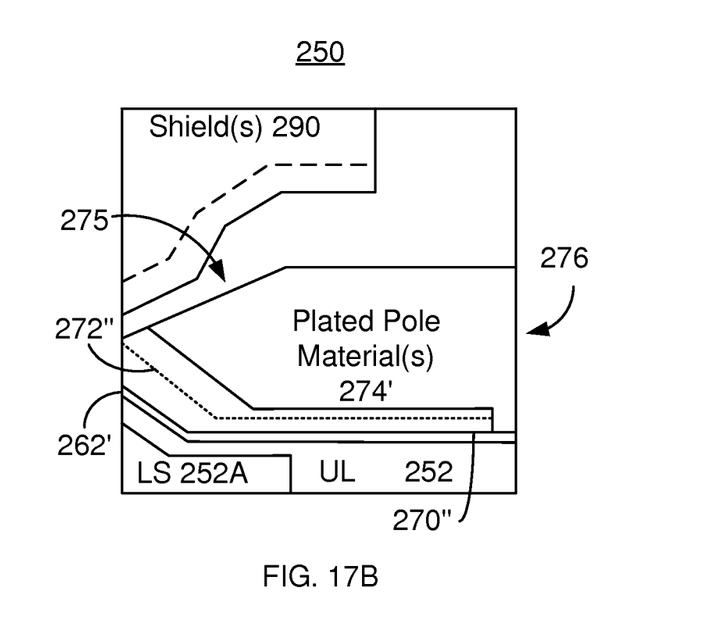

FIG. 7 depicts an exemplary embodiment of a method 150 for providing a magnetic recording transducer having a main pole formed at least in part using vacuum deposition. For simplicity, some steps may be omitted, interleaved, performed in another order and/or combined. FIGS. 8 though FIGS. 17A-B depict an exemplary embodiment of a transducer 250 during fabrication using the method 150. Referring to FIGS. 7-17B, the method 250 may be used to fabricate multiple magnetic recording heads at substantially the same time. The method 250 may also be used to fabricate other magnetic recording transducers. The method 250 is also described in the context of particular layers. A particular layer may include multiple materials and/or multiple sub-layers. The method 250 also may start after formation of other portions of the magnetic recording transducer. For example, the method 250 may start after a read transducer, return pole/shield and/or other structure have been fabricated.

The trench is then formed in the intermediate layer, via step 152. Step 152 may include forming a mask having an aperture corresponding to the location and footprint of the trench. An etch, such as a reactive ion etch (RIE) appropriate for the intermediate layer may be used. For example, an aluminum oxide RIE may be used for an aluminum oxide intermediate layer. FIG. 8 depicts an ABS view of the transducer 250 after step 152 is performed. An underlayer 252, which may include a leading shield, resides under the intermediate layer 254. A mask 256 having aperture 258 is also shown. Although a single hard mask layer is shown, the mask 256 may include multiple layers. A trench 260 has been formed in the intermediate layer 254.

Figure 9:
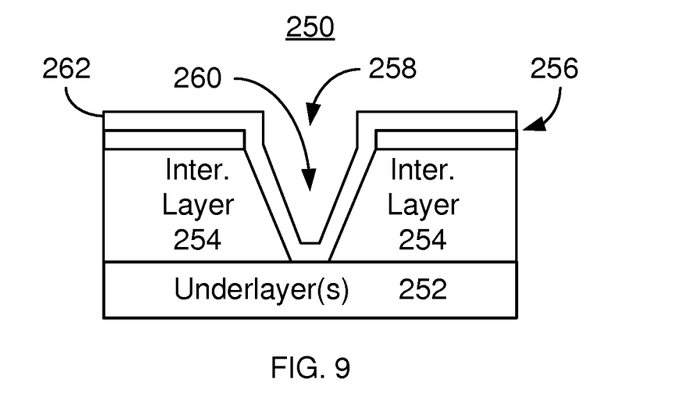

A seed layer that may be resistant to an etch of the intermediate layer is deposited in the trench, via step 154. In some embodiments, a Ru layer is deposited in step 154. In other embodiments, a Ta or other layer may be deposited. In some embodiments, a multilayer seed layer may be provided in step 152. FIG. 9 depicts an ABS view of the transducer 250 after step 152 is performed. Thus, a seed layer 262 has been deposited. A remaining portion of the trench 260 remains open.

Figure 10:
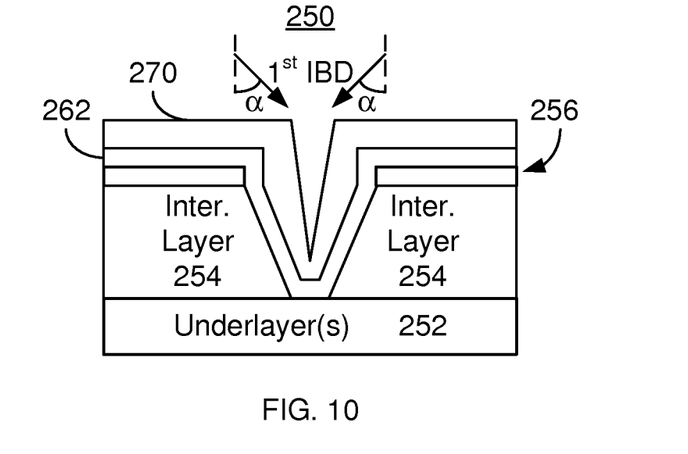

A first main pole layer is provided using a first IBD, via step 156. In some embodiments, the IBD may be performed in a rotation mode in step 156. FIG. 10 depicts an ABS view of the transducer 250 after step 156 is performed. Thus, the first main pole layer 270 is shown. Also indicated in FIG. 10 is the deposition angle, a, for the first IBD. For example, the first main pole layer 270 may include the material(s) and have the thickness(es) described above with respect to the method 110. Further, as can be seen in FIG. 10, a portion of the trench 260 (not labeled in FIG. 10 for clarity) remains open.

Figure 11:
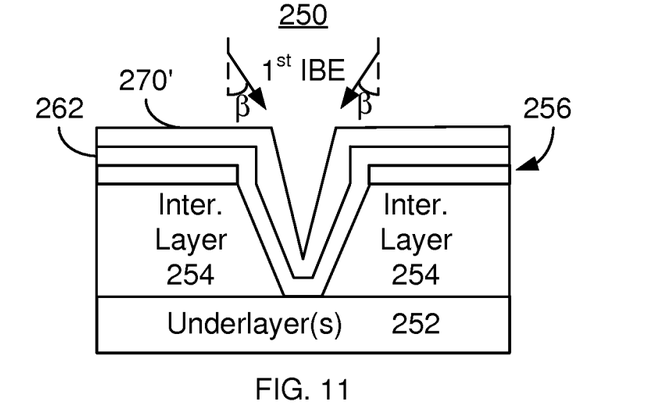

A portion of the first main pole layer is removed using a first IBE, via step 158. The IBE may be performed at an etch angle and may be accomplished using a sweep mode. The etch angle(s) and amount of material removed may be analogous to that described above for the method 110. FIG. 11 depicts an ABS view of the transducer 250 after step 158 is performed. Thus, a portion of the first main pole layer has been removed, leaving first main pole layer 270'. Also shown is the etch angle, β, for the first IBE of step 158. Because of the angle at which the IBE is performed, the material at the top of the remaining portion of the trench may be removed faster. Thus, the top of the remaining portion of the trench 260 (not labeled in FIG. 11) may be opened further.

Figure 12:
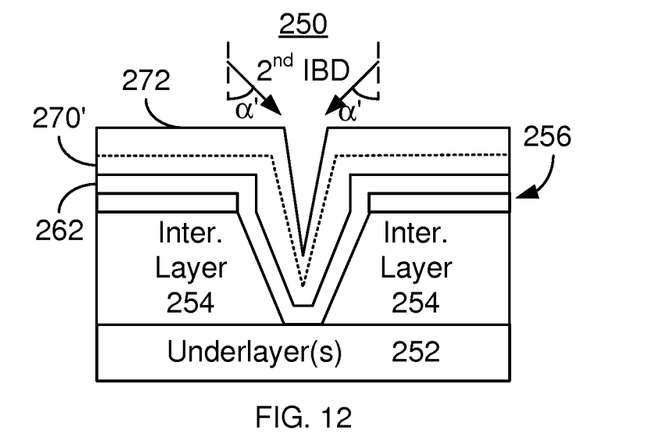

A second main pole layer is provided using a second IBD, via step 160. In some embodiments, the second IBD may be performed in a rotation mode in step 160. FIG. 12 depicts an ABS view of the transducer 250 after step 160 is performed. Thus, the second main pole layer 272 is shown. Also indicated in FIG. 11 is the deposition angle, a', for the second IBD. For example, the second main pole layer 272 may include the material(s) and have the thickness(es) described above with respect to the method 110. Further, as can be seen in FIG. 12, a portion of the trench 260 (not labeled in FIG. 12 for clarity) remains open.

Figure 13:
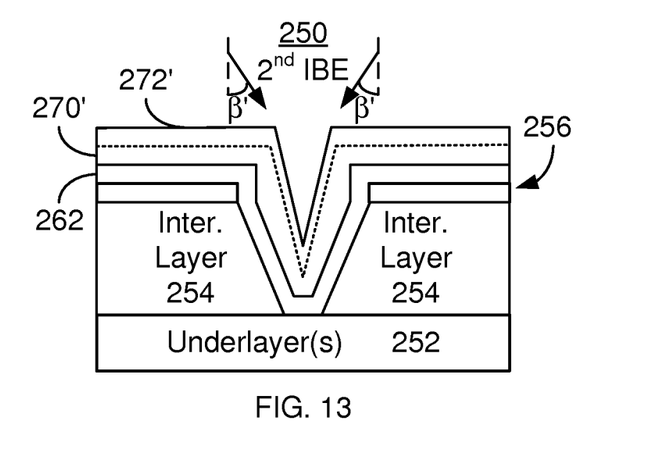

A portion of the second main pole layer may optionally be removed using a second IBE, via step 162. The second IBE may be performed at an etch angle and may be accomplished using a sweep mode. The etch angle(s) and amount of material removed may be analogous to that described above for the method 110. FIG. 13 depicts an ABS view of the transducer 250 after step 162 is performed. Thus, a portion of the second main pole layer has been removed, leaving first main pole layer 272'. Also shown is the etch angle, β', for the second IBE of step 162. Because of the angle at which the IBE is performed, the material at the top of the remaining portion of the trench may be removed faster. Thus, the top of the remaining portion of the trench 260 (not labeled for clarity in FIG. 13) may be opened further.

A third main pole layer may optionally be provided using a third IBD, via step 164. In some embodiments, the third IBD may be performed in a rotation mode in step 164. The third main pole layer may include the material(s) and have the thickness(es) described above with respect to the method 110. The IBD may be performed in an analogous manner and at analogous deposition angles as for the steps 156 and 160. Further, a portion of the trench 260 remains open after step 164. A portion of the third main pole layer may optionally be removed using a third IBE, via step 166. The third IBE may be performed at an etch angle and may be accomplished using a sweep mode. The etch angle(s) and amount of material removed may be analogous to that described above for steps 158 and 162. The top of the remaining portion of the trench 260 may be opened further in step 166. One or more of the steps 156, 158, 160, 162, 164 and/or 166 may optionally be repeated, via step 168. Thus, the desired thickness of vacuum deposited (IBD) material may be provided.

Figure 14:
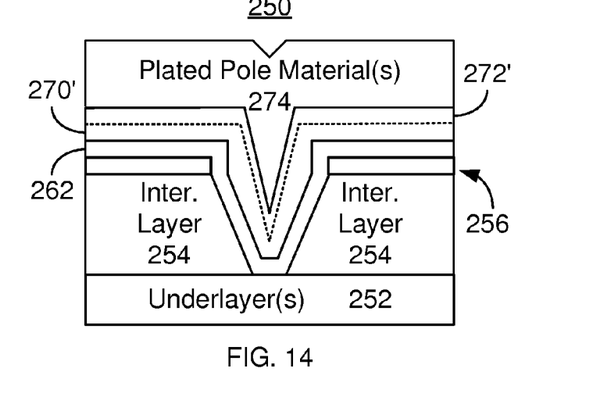

An additional main pole layer is provided without using vacuum deposition, via step 170. For example, step 170 may include plating the additional main pole layer. FIG. 14 depicts an ABS view of the transducer 250 after step 170 is performed. In the embodiment shown in FIGS. 14-17B, two IBD layers 270' and 272' are used. The plated materials 274 not only fill the trench 260 (not labeled in FIGS. 14-17B), but also cover a portion of the magnetic transducer 250/intermediate layer 254 outside of the trench. The material(s) and thicknesses plated in step 170 may be analogous to those described above.

Figure 15:
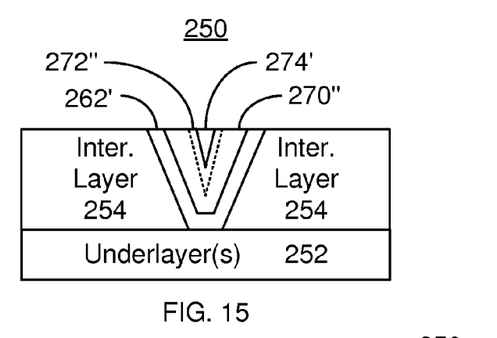

The main pole material(s) may be planarized, via step 172. Step 172 may utilize a CMP. In addition, an ion mill may be performed to remove the mask 256 and/or other material(s) outside of the trench. FIG. 15 depicts the transducer 250 after step 172 has been performed. Thus, the seed layer 262' and the pole materials 270", 272" and 274' remain in the trench.

Figure 16A:
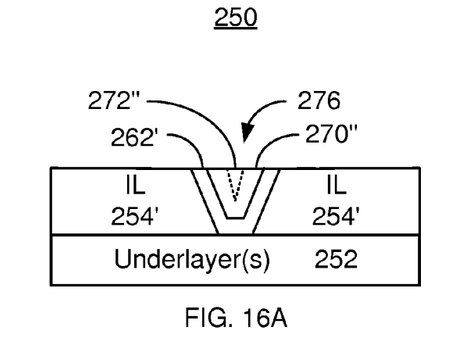
Figure 16B:
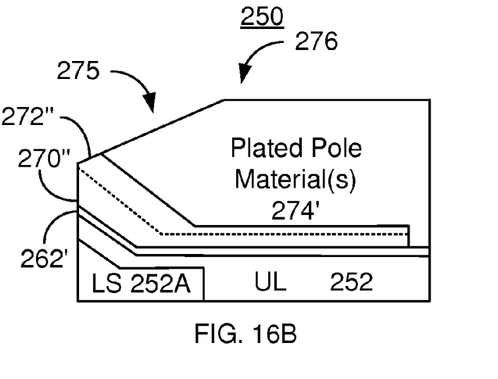

A portion of the main pole material(s) may be removed to form a trailing bevel, via step 174. Step 174 may include masking a portion of the transducer recessed from the ABS and performing an ion mill. In some embodiments, step 174 may be interleaved with step(s) 176 and/or 178. FIGS. 16A and 16B depict ABS and apex (side) views of the transducer 250 after step 174 is performed. Thus, trailing bevel 275 has been formed. The pole materials 270", 272" and 274' form main pole 276. In the embodiment shown, the plated pole material(s) 274' are not at the ABS after formation of the bevel 275. However, in other embodiments, some portion of the plated pole material(s) 274' may reside at the ABS. In addition, a leading shield 252A is explicitly shown in underlayer 252.

A write gap is formed, via step 176. The write gap lies on top of the main pole 276. Note that the side gap may be formed by the seed layer 262'. The shield(s) are provided, via step 178. Step 178 may include providing side shields, a trailing shield, and/or a wraparound shield (which includes side and trailing shields). FIGS. 17A and 17B depict ABS and apex views of the transducer 250 after step 178 is performed. Thus, gap 280 and shield(s) 290 are shown. In the embodiment shown, the shield 290 is a wraparound shield. In some embodiments, a magnetic seed may be used. This is indicated by the dashed line in the shield 290 in FIG. 17B.

Using the method 150, a main pole 276 having improved performance may be fabricated. In particular, portions 720" and 272" of the main pole may be formed using IBD and IBE. This formation process allows for a higher saturation magnetization, void-free main pole 276. Thus overwrite gain, field gradient and reliability may be improved. Further, the domain structure of the main pole 276 may be closer to that desired. Use of the method 150 may reduce or eliminate the formation of a stripe domain structure. Thus, performance of the main pole 276 may be improved. Finally, the use of electroplated materials 274' for the main pole 276 may facilitate fabrication without adversely affecting performance of the main pole. Thus, performance of the main pole 276 and transducer 250 fabricated using the method 150 may be improved.

We claim:

1. A method for fabricating magnetic transducer having air-bearing surface (ABS) location and an intermediate layer comprising:
    forming a trench in the intermediate layer, the trench having a shape and location corresponding to a main pole;
    providing a main pole, at least a portion of the main pole residing in the trench, the step of providing the main pole further including
        vacuum depositing a first main pole material layer, the first main pole material layer being thin enough to preclude filling of the trench;
        ion beam etching a portion of the first main pole material layer within the trench;
        vacuum depositing a second main pole layer, the second main pole material layer being thin enough to preclude filling of the trench; and
        depositing an additional main pole layer.

2. The method of claim 1 wherein the step of providing the main pole further includes:
    removing a portion of at least the additional main pole layer, forming a trailing bevel in the main pole.

3. The method of claim 1 further comprising:
    providing a write gap; and
    providing a shield.

4. The method of claim 3 wherein the shield includes a wraparound shield.

5. The method of claim 1 wherein the step of depositing the additional pole layer further includes:
    at least one of plating the additional pole layer and sputtering the additional pole layer.

6. A method for fabricating magnetic transducer having air-bearing surface (ABS) location and an intermediate layer comprising:
    forming a trench in the intermediate layer, the trench having a shape and location corresponding to a main pole;
    providing a main pole, at least a portion of the main pole residing in the trench, the step of providing the main pole further including
        vacuum depositing a first main pole material layer, the first main pole material layer being thin enough to preclude filling of the trench;
        ion beam etching a portion of the first main pole material layer;
    vacuum depositing a second main pole layer, the second main pole material layer being thin enough to preclude filling of the trench;
        ion beam etching a portion of the second main pole material layer, a remaining portion of the first main pole layer and the second main pole layer partially filling the trench such that a portion of the trench remains open; and
        depositing an additional main pole layer after the step of ion beam etching.

7. The method of claim 6 wherein the step of providing the main pole further includes:
    vacuum depositing a third main pole material layer before the step of depositing the additional main pole layer, the third main pole material layer being thin enough to preclude filling of the trench; and
    ion beam etching a portion of the third main pole material layer before the step of depositing the additional main pole layer.

8. A method for fabricating magnetic transducer having air-bearing surface (ABS) location and an intermediate layer comprising:
    forming a trench in the intermediate layer, the trench having a shape and location corresponding to a main pole;
    providing a main pole, at least a portion of the main pole residing in the trench, the step of providing the main pole further including
        vacuum depositing a first main pole material layer, the first main pole material layer being thin enough to preclude filling of the trench;
        ion beam etching a portion of the first main pole material layer;
        vacuum depositing a second main pole layer, the second main pole material layer being thin enough to preclude filling of the trench, wherein the step of vacuum depositing the first main pole layer further includes
            ion beam depositing the first main pole layer at an ion beam deposition angle of at least zero degrees and not more than sixty degrees from a direction perpendicular to a surface of the intermediate layer in a rotation mode; and
    depositing an additional main pole layer.

9. The method of claim 8 wherein the first main pole layer has a thickness of at least ten nanometers and not more than one hundred nanometers.

10. A method for fabricating magnetic transducer having air-bearing surface (ABS) location and an intermediate layer comprising:
    forming a trench in the intermediate layer, the trench having a shape and location corresponding to a main pole;
    providing a main pole, at least a portion of the main pole residing in the trench, the step of providing the main pole further including
        vacuum depositing a first main pole material layer, the first main pole material layer being thin enough to preclude filling of the trench;
        ion beam etching a portion of the first main pole material layer, wherein the step of ion beam etching the first main pole layer is performed at an ion beam etch angle of at least zero degrees and not more than sixty degrees from a direction perpendicular to a surface of the intermediate layer;
        vacuum depositing a second main pole layer, the second main pole material layer being thin enough to preclude filling of the trench; and
    depositing an additional main pole layer.

11. The method of claim 10 wherein the step of ion beam etching the first main pole layer removes at least one nanometer and not more than ten nanometers of the first main pole layer.

12. A method for fabricating magnetic transducer having air-bearing surface (ABS) location and an intermediate layer comprising:
    forming a trench in the intermediate layer, the trench having a shape and location corresponding to a main pole;
    providing a main pole, at least a portion of the main pole residing in the trench, the step of providing the main pole further including
        vacuum depositing a first main pole material layer, the first main pole material layer being thin enough to preclude filling of the trench;
        ion beam etching a portion of the first main pole material layer;

vacuum depositing a second main pole layer, the second main pole material layer being thin enough to preclude filling of the trench, wherein the step of vacuum depositing the second main pole layer further includes ion beam depositing the second main pole layer at an ion beam deposition angle of at least zero degrees and not more than sixty degrees from a direction perpendicular to a surface of the intermediate layer in a rotation mode; and depositing an additional main pole layer.

13. The method of claim 12 wherein the second main pole layer has a thickness of at least ten nanometers and not more than one hundred nanometers.

14. A method for fabricating magnetic transducer having air-bearing surface (ABS) location and an intermediate layer comprising:

forming a trench in the intermediate layer, the trench having a shape and location corresponding to a main pole;

providing a main pole, at least a portion of the main pole residing in the trench, the step of providing the main pole further including ion beam depositing a first main pole material layer at a first ion beam deposition angle of at least fifty degrees and not more than fifty-two degrees from a direction perpendicular to a surface of the intermediate layer in a rotation mode, the first main pole material layer having a thickness of at least forty nanometers and not more than fifty nanometers such that filling of the trench by the first main pole material is precluded;

ion beam etching a portion of the first main pole material layer at a first ion beam etch angle of at least fifty-four degrees and not more than fifty-six degrees from the direction in a sweep mode, the first ion beam etch removing at least three nanometers and not more than seven nanometers of the first main pole material layer;

ion beam depositing a second main pole material layer at a second ion beam deposition angle of at least thirty-seven degrees and not more than thirty-nine degrees from the direction in the rotation mode, the second main pole material layer having a thickness of at least forty nanometers and not more than fifty nanometers such that filling of the trench by the second main pole material is precluded;

ion beam etching a portion of the second main pole material layer at a second ion beam etch angle of at least thirty-nine degrees and not more than forty-one degrees from the direction in a sweep mode, the first ion beam etch removing at least three nanometers and not more than seven nanometers of the first main pole material layer; and plating an additional main pole layer.

15. A magnetic transducer having air-bearing surface (ABS) location comprising:

a main pole including at least one vacuum deposited layer and at least one deposited layer, the at least one vacuum deposited layer being free of voids, the main pole being free of stripe domains, the main pole further including a trailing bevel; and at least one coil for energizing the main pole.

16. The magnetic transducer of claim 15 further comprising:

a leading shield;

a side gap; and a wraparound shield, the side gap residing between the main pole and the wraparound shield.

17. The magnetic transducer of claim 15 wherein the at least one deposited layer includes at least one of a plated layer and a sputtered layer.

\* \* \* \* \*